(12) United States Patent
Hara

(10) Patent No.: US 6,804,033 B1
(45) Date of Patent: Oct. 12, 2004

(54) IMAGE PROCESSING APPARATUS AND METHOD, AND IMAGE PROCESSING SYSTEM

(75) Inventor: Kenji Hara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 646 days.

(21) Appl. No.: 09/688,224

(22) Filed: Oct. 16, 2000

(30) Foreign Application Priority Data

Oct. 18, 1999 (JP) ............................................. 11-295516

(51) Int. Cl.[7] .............................. G03F 3/08; H04N 1/46; H04N 3/08; G06F 15/00; G06K 9/00; G06K 9/34

(52) U.S. Cl. ........................ 358/522; 358/505; 358/515; 358/1.9; 358/500; 358/501; 358/517; 358/518; 382/145; 382/168; 382/171; 382/173; 382/176

(58) Field of Search ................................. 358/505, 522, 358/515, 1.9, 500, 501, 517, 518; 382/168, 165, 171, 173, 176

(56) References Cited

U.S. PATENT DOCUMENTS 5,296,939 A * 3/1994 Suzuki ........................ 358/453

5,680,230 A * 10/1997 Kaburagi et al. ............ 358/520
6,504,628 B1 * 1/2003 Kanno et al. ................ 358/522

FOREIGN PATENT DOCUMENTS

| JP | 11-133697 | 5/1921 | |
| JP | 08-032812 | * 2/1996 | ............ H04N/1/41 |
| JP | 9-172550 | 6/1997 | |

* cited by examiner

Primary Examiner—Edward Coles
Assistant Examiner—Houshang Safaipour
(74) Attorney, Agent, or Firm—Fitzpatrick, Cella, Harper & Scinto

(57) ABSTRACT

Upon executing auto color select (ACS) generally, since a prescan for ACS must be done before a main scan for capturing actual image data, a long processing time is required, resulting in low productivity.

In this invention, an ACS task is executed while the scanner is making an image capture scan. If the ACS task determines that the captured original is a color original, the ACS task informs the printer of that information, and then normally terminates itself. After the end of scan, if it is not determined that the original is a color original, information indicating that the original is a monochrome original is sent to the printer. Hence, appropriate ACS can be done without any prescan.

15 Claims, 12 Drawing Sheets

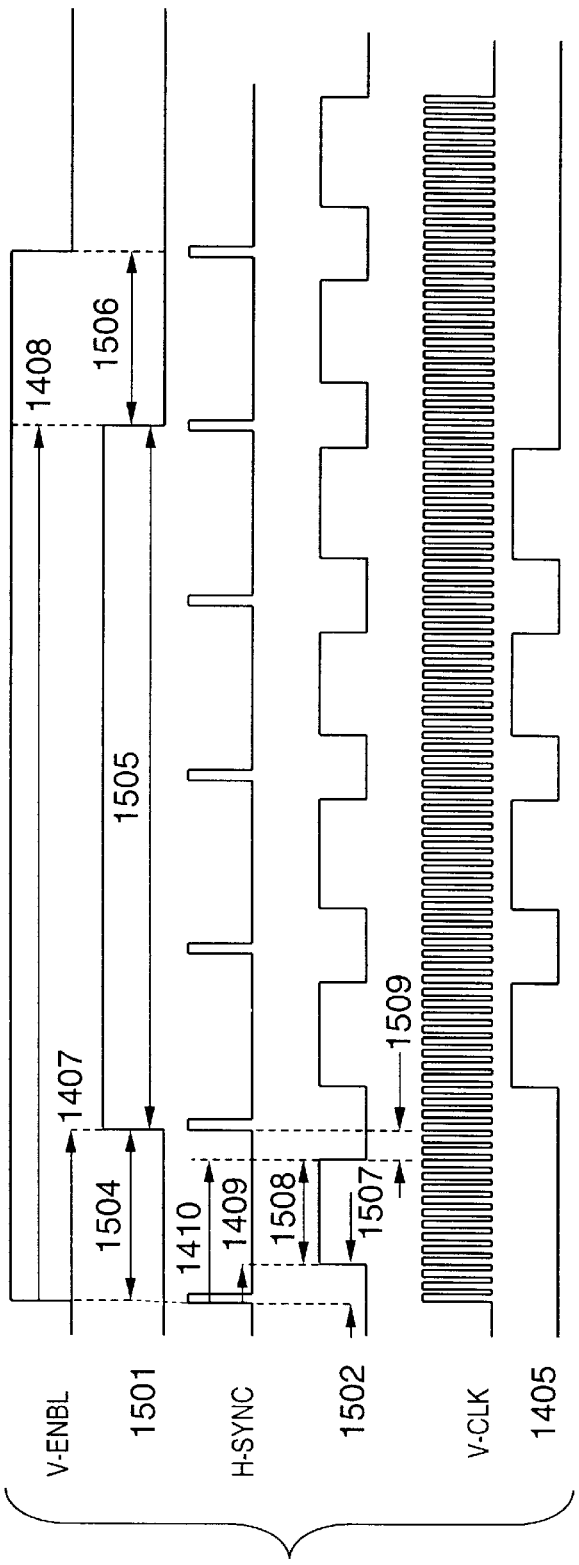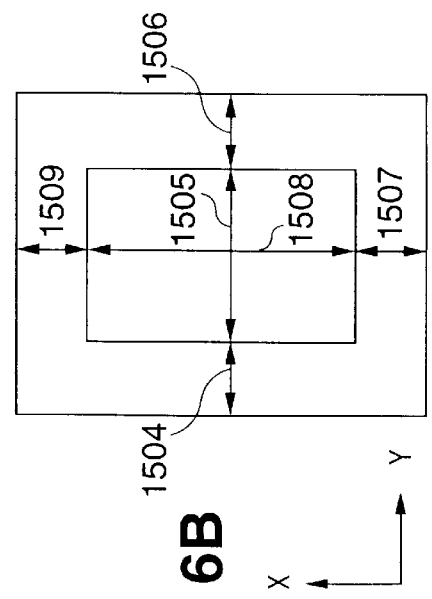

FIG. 12

| IMAGE NO. | COLOR INFORMATION | IMAGE SIZE |
|---|---|---|
| 1 | COLOR | STANDARD A4 |
| 2 | MONOCHROME | STANDARD A4 |
| 3 | | |
| 4 | | |

IMAGE PROCESSING APPARATUS AND METHOD, AND IMAGE PROCESSING SYSTEM

FIELD OF THE INVENTION

The present invention relates to an image processing apparatus and method, which make color discrimination of input image data, and an image processing system.

BACKGROUND OF THE INVENTION

Some image processing apparatuses that input image data by scanning an original image have an auto color select (ACS) function of automatically discriminating if the scanned original image is a monochrome or color image.

However, to execute ACS, the conventional image processing apparatus must perform a prescan for ACS before a main scan for scanning actual image data. Hence, a long processing time is required compared to the main scan alone without ACS, thus impairing the productivity of the apparatus as a whole.

SUMMARY OF THE INVENTION

The present invention has been proposed to solve the conventional problems, and has as its object to provide an image processing apparatus and method, which can improve the productivity of the apparatus as a whole by executing ACS at high speed with respect to an original image, and an image processing system.

According to the present invention, the foregoing object is attained by providing an image processing apparatus comprising: input means for inputting image data of an original by a single optical scan; discrimination means for discriminating based on the image data if the original is a color original; discrimination result holding means for holding a discrimination result of the discrimination means; image holding means for holding the image data; and output means for outputting the image data held in the image holding means on the basis of the discrimination result.

In accordance with the present invention as described above, appropriate ACS can be done without any prescan.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A and 6B are views showing the relationship between an image signal and ACS region in the scanner module;

FIG. 12 shows an example of an image information table.

DETAILED DESCRIPTION OF THE PREFERRED EMBODIMENTS

Preferred embodiments of the present invention will now be described in detail in accordance with the accompanying drawings.

The basic arrangement of an image forming apparatus according to an embodiment of the present invention will be described first with reference to FIGS. 1 to 4.

Figure 1:
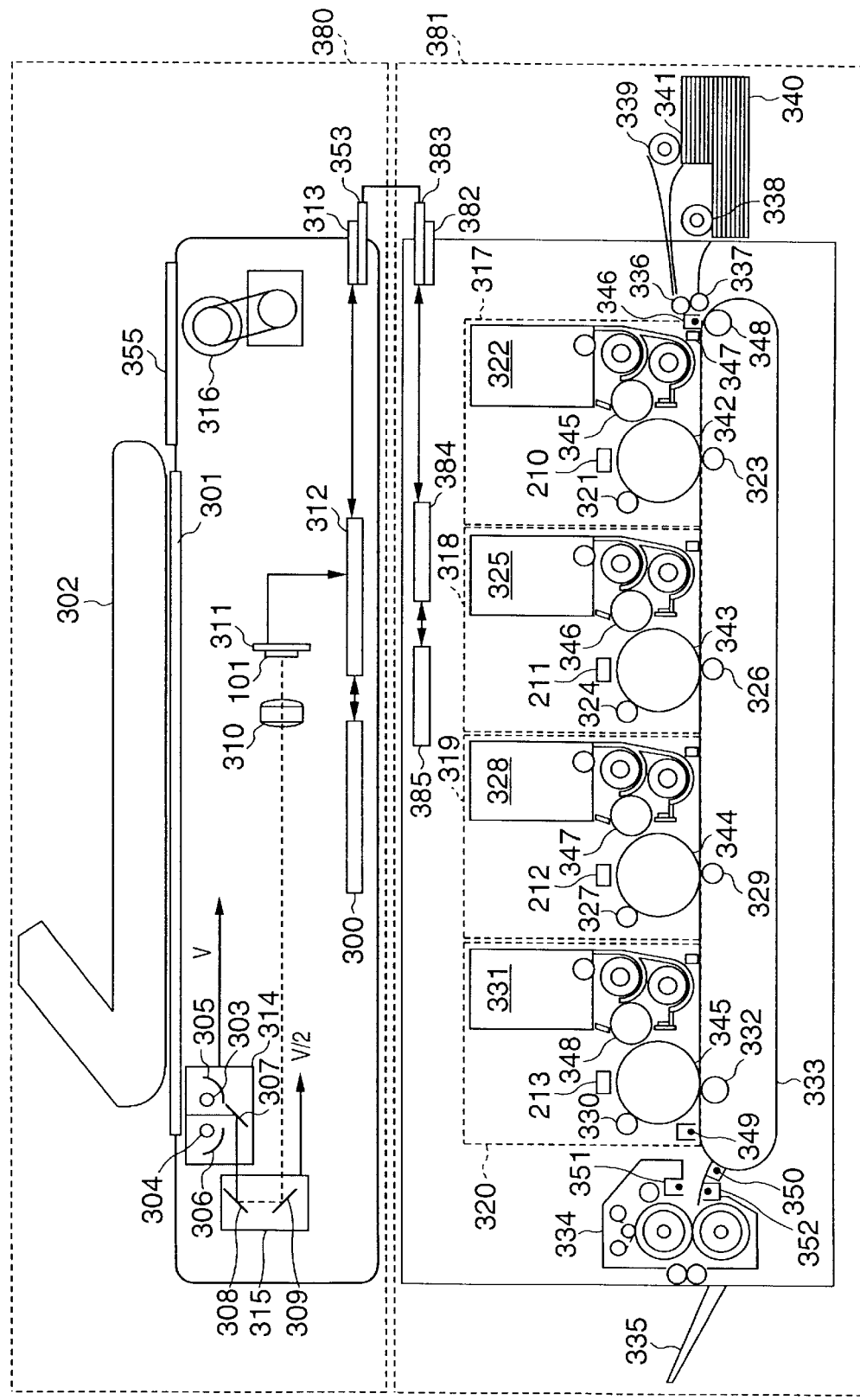
FIG. 1 is a sectional view showing the overall arrangement of an image forming apparatus according to the present invention.

FIG. 1 is a block diagram showing the overall arrangement of an image forming apparatus according to the embodiment of the present invention. Referring to FIG. 1, the image forming apparatus of this embodiment is roughly divided into a scanner module 380 and printer module 381. The arrangements of these modules will be described in detail below.

<Arrangement of Scanner Module>

The arrangement of the scanner module 380 will be described in detail below with reference to FIG. 1.

[Outline of Apparatus Arrangement]

In the scanner module 380, reference numeral 101 denotes a CCD for detecting a color image signal. The CCD 101 may have an inline arrangement in which R, G, and B color filters are set on a 1-line CCD in the order of R, G, and B, or may be a 3-line CCD in which R, G, and B filters are set on the individual lines. Also, the filters may be integrated on a chip or independent from the CCD. Reference numeral 311 denotes a board on which the CCD 101 is mounted.

Reference numeral 300 denotes a scanner CPU which controls the overall scanner module 380 using a RAM or the like (not shown) as a work area on the basis of a control program stored in a ROM (not shown). Reference numeral 312 denotes a digital image processing unit which converts an analog image signal sent from the CCD board 311 into a digital signal, and executes a digital image process. The image processing unit 312 is formed on an image processing board.

Reference numeral 301 denotes a platen glass; and 302, a document feeder. Note that a pressing plate (not shown) may be attached in place of the document feeder 302.

Reference numerals 303 and 304 denote light sources (halogen lamps, fluorescent lamps, or the like) for illuminating an original; 305 and 306, reflectors for focusing light coming from the light sources 303 and 304 on an original; 307 to 309, mirrors for optically guiding an optical image of an original set on the platen to the CCD 101; 310, a lens for focusing the light projected by the mirrors on the CCD 101; 314, a first mirror base (to be referred to as a first carriage hereinafter) that houses the halogen lamps 303 and 304, reflectors 305 and 306, and mirror 307; 315, a second mirror base (to be referred to as a second carriage hereinafter) that houses the mirrors 308 and 309; and 316, a stepping motor driving unit for driving the first and second carriages 314 and 315 in the sub-scan direction (right-and-left direction in FIG. 1).

Reference numeral 313 denotes an external interface for interfacing with other devices. The external interface 313 can connect devices that require use of an image scanned by this scanner, such as a LAN interface device for connecting to the network, a SCSI interface device for connecting to a personal computer or the like, a FAX device that provides a FAX function, and the like, although such devices are not shown in this embodiment. When the scanner CPU 300 and a CPU of an external device communicate with each other via the external interface 313, image data of a predetermined format can be output from the external interface 313 at a predetermined timing.

Reference numeral 353 denotes a dedicated interface used to exchange image data and various commands with a printer for outputting an image, when the scanner module 380 is used as a part of an image copying apparatus.

Reference numeral 355 denotes a console which displays the state of the overall image forming apparatus including the scanner module 380 and printer module 381, and accepts a user instruction input and the like, and comprises an LED panel, various operation buttons, and the like.

[Scan Method]

An example of the scan method in the scanner module 380 will be explained below.

When the user sets an original on the DF (document feeder) 302 or the platen glass 301, the scanner CPU 300 issues an instruction for an image scan to the respective units in response to an original scan event such as depression of a copy button on the console 355. More specifically, the light sources 303 and 304 are turned on to activate the CCD board 311, and image processing parameters are set in the digital image processing unit 312.

When the scanner module is ready to scan, the stepping motor driving unit 316 drives the first carriage 314 in the sub-scan direction (in a direction perpendicular to the sensor lineup direction (main scan direction) of the CCD 101) at equal speed, thus sequentially illuminating the entire surface of the original with light. At this time, the second carriage 315 is designed to move at a speed ½ that of the first carriage 314, so that light reflected by the original is adequately focused on the CCD 101.

The CCD 101 is constructed by lining up light-receiving sensors in the main scan direction (a direction pointing into the plane of paper of FIG. 1), and can read analog voltages proportional to the amounts of light in turn from registers corresponding to the light-receiving sensors. The entire surface of the original can be scanned as a two-dimensional image by repeating the successive voltage read in the main scan direction in the CCD 101, and movement of the first carriage 314 in the sub-scan direction. Note that the obtained two-dimensional image data forms a linear sequence along the time axis.

The image data captured by the CCD 101 is transferred to the digital image processing unit 312, and undergoes an appropriate image process. After that, the image data is output outside the scanner module 380 via the external interface 313 or the printer interface 353.

[Details of Scanner Image Process]

Figure 2:
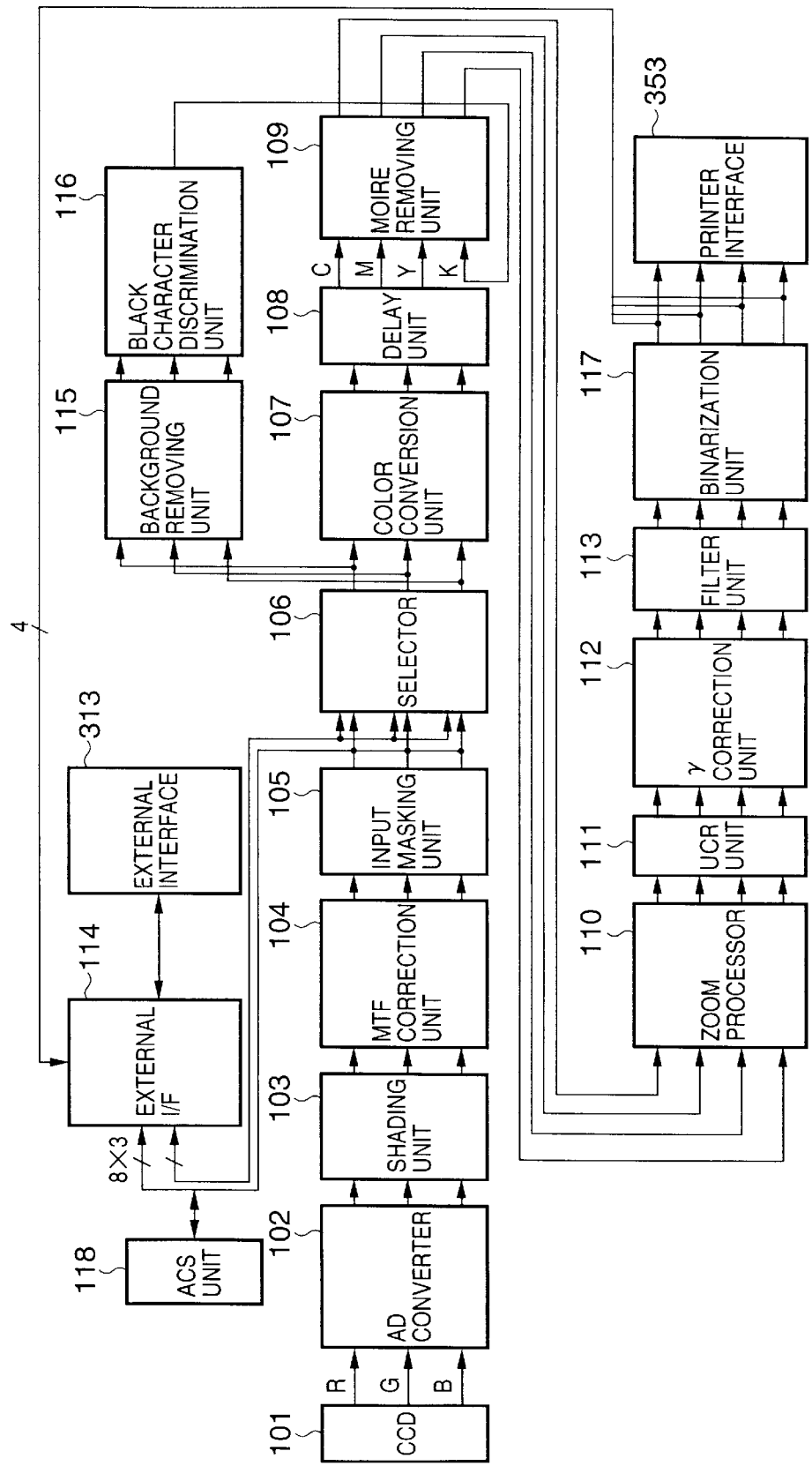
FIG. 2 is a block diagram showing the arrangement of an image processing unit in a scanner module.

The digital image process in the digital image processing unit 312 executed when the scanner module 380 operates as a part of an image copying apparatus will be explained below. FIG. 2 is a block diagram showing details of the arrangement of the digital image processing unit 312. The building components shown in FIG. 2 are controlled by the scanner CPU 300.

After an original image on the platen glass 301 is guided to the CCD 101 and is converted into an analog electrical signal, as described above, the analog signal is input to the digital image processing unit 312. The analog image signal input to the digital image processing unit 312 is sampled and held (S/H), is clamped to have the dark level of the analog image signal as a reference potential, is amplified to a predetermined level, and is then A/D-converted in an A/D converter 102, thus being converted into, e.g., R, G, and B 8-bit digital signals. Note that the processing order in this arrangement is not limited to this specific example, but can be changed as needed.

The obtained R, G, and B signals undergo shading correction and black correction in a shading unit 103. The R, G, and B signals are then input to an MTF correction unit 104 and undergo a concatenation process, MTF correction process, and original detection process. Note that the concatenation process corrects the signal timings to obtain identical scan positions on three lines by adjusting delay amounts in units of lines in accordance with the scan speed, since the scan positions on lines are different when the CCD 101 is a 3-line CCD. On the other hand, the MTF correction process corrects a change in MTF since scan MTF changes depending on the scan speed and zoom ratio. The original detection process recognizes the original size by scanning an original on the platen glass 301.

The digital signals, the scan position timings of which have been corrected, undergo correction of the spectral characteristics of the CCD 101, light sources 303 and 304, and reflectors 305 and 306 in an input masking unit 105. The outputs from the input masking unit 105 are input to a selector 106 which can switch outputs between the signals from the input masking unit 105 and signals externally input via an external I/F 114. The signals output from the selector 106 are input to a color conversion unit 107 and background removal unit 115. The signals input to the background removal unit 115 undergo a background removal process, and are then input to a black character discrimination unit 116 that discriminates if an image expressed by the input signals forms a black character in an original, and generates a black character discrimination signal. The color conversion unit 107, which also receives the outputs from the selector 106, checks if the read image signal falls within a color range that the printer can reproduce. If the image signal falls within that color range, the color conversion unit 107 does not process the input signals; otherwise, the unit 107 executes a color space compression process, so that the signals fall within the color range. The color conversion unit 107 executes a background removal process, and then converts the R, G, and B signals into C, M, and Y signal by LOG conversion.

In order to correct a timing offset from the black character discrimination signal generated by the black character discrimination unit 116, the timings of the C, M, and Y signals output from the color conversion unit 107 are adjusted by a delay unit 108. From these two different types of signals, moiré is removed by a moiré removal unit 109, and the signals undergo a zoom process in the main scan direction by a zoom processor 110. The processed signals are then input to a UCR unit 111. The UCR unit 111 executes a UCR (undercolor removal) process of the C, M, and Y signals, thus generating C, M, Y, and K signals. Furthermore, the C, M, Y, and K signals undergo a masking process to be corrected to those which match the output characteristics of the printer, and the black character discrimination signal is fed back to the C, M, Y, and K signals. The C, M, Y, and K signals output from the UCR unit 111 undergo density adjustment in a γ correction unit 112, and then undergo a smoothing or edge process in a filter unit 113.

The C, M, Y, and K signals processed in this way are converted from 8-bit multivalued signals into binary signals by a binarization unit 117. Note that this conversion method may use any of dithering, error diffusion, a method that modifies these methods, and the like. With these processes, the image signals are sent to the printer or another device via the external interface 313.

Reference numeral 118 denotes an ACS unit as a characteristic feature of this embodiment. The ACS unit 118 executes an ACS process on the basis of the R, G, and B signals output from the input masking unit 105. Details of the ACS unit 118 will be explained later.

[Generation of Image Signal]

An image signal generation process in the scanner module 380 will be described below with reference to FIGS. 3A and 3B.

Figure 3A:
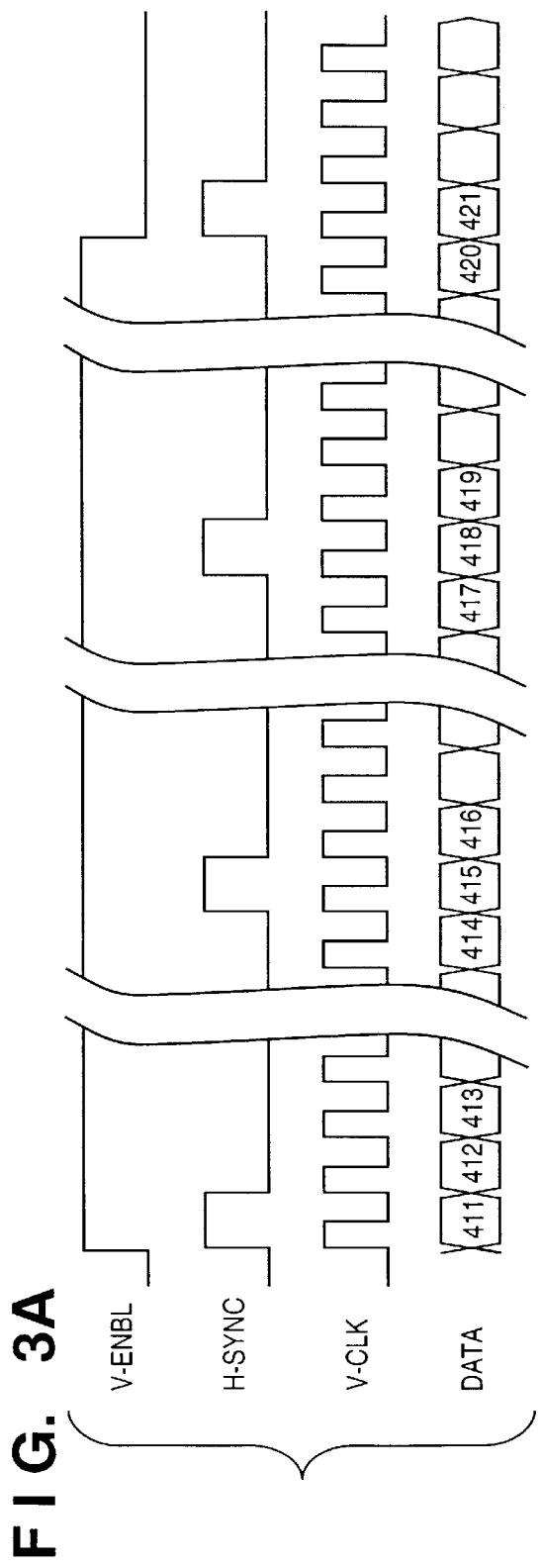
FIGS. 3A and 3B are views showing the generation processes of an image signal in the scanner module.

FIG. 3A is a timing chart showing the scan timing of an image signal in the scanner module 380. In FIG. 3A, V-ENBL is a signal indicating an effective image period in the sub-scan direction, H-SYNC is a sync signal in the main scan direction, V-CLK is a sync signal per pixel in the main scan direction, and DATA is an image signal which is read from the CCD 101 and is A/D-converted. Note that only one signal is shown as DATA, but Data-R, Data-G, and Data-B are present in practice in correspondence with R, G, and B color components.

Figure 3B:
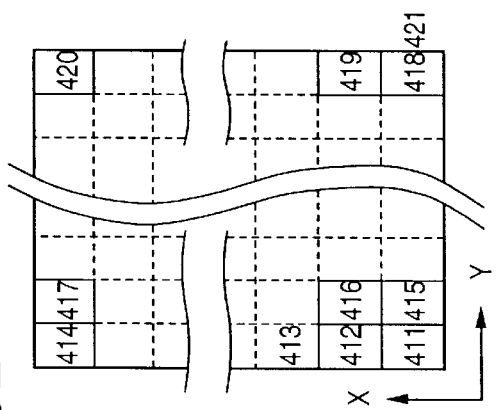

FIG. 3B illustrates the correspondence between the original image and the image signal obtained by scanning that image. The main scan direction in FIG. 3B agrees with the X-direction, and the sub-scan direction agrees with the Y-direction. That is, the CCD 101 comprises pixels (light-receiving sensors) in the X-direction, and captures image signals while moving from the left to right (in the Y-direction) in FIG. 3B.

As described above, since V-ENBL indicates an effective region of an image, it becomes an effective level and indicates the effective region of image data, i.e., its start point in this case, when the first carriage 314 driven at equal speed has reached the scan start point of the original shown in FIG. 3B. At this time, an image that the first carriage 314 projects onto the CCD 101 corresponds to the first main scan line indicated by 411 to 414 in FIG. 3B.

At this time, H-SYNC is generated in response to the effective edge of a sync signal in the sub-scan direction as a trigger, and an image is read from the CCD 101 in synchronism with V-CLK. The read image is converted into digital image data 411, 412, 413, 414, ... in the digital image processing unit 312.

The first carriage 314 is accurately controlled to move to the next scan line for the time corresponding to one period of H-SYNC, and upon completion of read of the first line, DATA 415 to 417 of the second line are similarly read. This operation is sequentially repeated to read up to DATA 418 to 420 of the last line. Upon completion of the scan in the sub-scan direction, V-ENBL is turned off to indicate that image data is ineffective. For example, 421 in FIG. 3B indicates image data outside the effective image range.

In this manner, the scanner module 380 can scan an original image to capture it as two-dimensional image data.

<Arrangement of Printer Module>

The arrangement of the printer module 381 will be described in detail below with reference to FIG. 1.

[Outline of Apparatus Arrangement]

In the printer module 381, reference numeral 385 denotes a printer CPU which controls the overall printer module 381 using a RAM or the like (not shown) as a work area on the basis of a control program stored in a ROM (not shown). Reference numeral 384 denotes an image processing unit for executing an image process for generating a signal to be used in image formation (to be described later). Reference numeral 383 denotes a scanner interface which serves as an interface for connecting a scanner device when the printer module 381 is used as a part of an image copying apparatus.

Reference numeral 382 denotes an external interface. This external interface 382 can connect devices which are required to output an image to this printer, such as a LAN interface device for connecting to the network, a SCSI interface device for connecting to a personal computer or the like, and the like, although these devices are not shown in this embodiment. When the printer CPU 385 and a CPU of an external device communicate with each other via this interface, image data of a predetermined format can be output from the external interface 382 at a predetermined timing.

Reference numeral 317 denotes an M image forming unit; 318, a C image forming unit; 319, a Y image forming unit; and 320, a K image forming unit. Since the image forming units 317 to 320 have the same arrangement, the arrangement of the M image forming unit 317 will be explained in detail below, and a description of other image forming units will be omitted.

In the M image forming unit 317, reference numeral 342 denotes a photosensitive drum on the surface of which a latent image is formed upon irradiation of light from an LED array 210. Reference numeral 321 denotes a primary charger for charging the surface of the photosensitive drum 342 to a predetermined potential to prepare for latent image formation. Reference numeral 322 denotes a developer for developing a latent image on the photosensitive drum 342 to form a toner image. Note that the developer 322 includes a sleeve 345 that applies a developing bias to develop an image. Reference numeral 323 denotes a transfer charger for transferring the toner image on the photosensitive drum 342 onto a recording sheet or the like on a transfer belt 333 by discharging from the back surface of the transfer belt 333. Note that the printer module 381 of this embodiment has no cleaner unit for cleaning residual toner since it has high transfer efficiency, but a cleaner unit may be added.

[Image Forming Method]

The respective building components will be explained below along the actual image forming procedure. Recording sheets or the like stored in a cassette 340 or 341 are picked up by a pickup roller 339 or 338 one by one, and the picked-up sheet is fed onto the transfer belt 333 by paper feed rollers 336 and 337. Reference numeral 348 denotes a transfer belt roller which drives the transfer belt 333 and charges the fed recording sheet to a predetermined potential in combination with an attraction charger 346 to attract the recording sheet on the transfer belt 333. Reference numeral 347 denotes a paper leading end sensor for detecting the leading end of the recording sheet on the transfer belt 333. Note that the detection signal of the paper leading end sensor 347 is also sent to the scanner module 380, and is used as a sub-scan sync signal upon sending an image signal to the printer module 381.

After that, the recording sheet is conveyed by the transfer belt 333, and toner images are formed on the surface of the recording sheet in the order of M, C, Y, and K in the image forming units 317 to 320. The recording sheet that has left the K image forming unit 320 undergoes charge removal by a charge remover 349 to facilitate separation from the transfer belt 333, and is then separated from the transfer belt 333. Reference numeral 350 denotes a peeling charger which prevents image disturbance due to peeling discharge upon separating the recording sheet from the transfer belt 333. The separated recording sheet is charged by pre-fixing chargers 351 and 352 to prevent image disturbance by compensating for the toner attraction force, and the toner image is thermally fixed on the sheet by a fixing device 334. Then, the recording sheet is exhausted onto an exhaust tray 335.

[Details of Printer Image Process]

Figure 4:
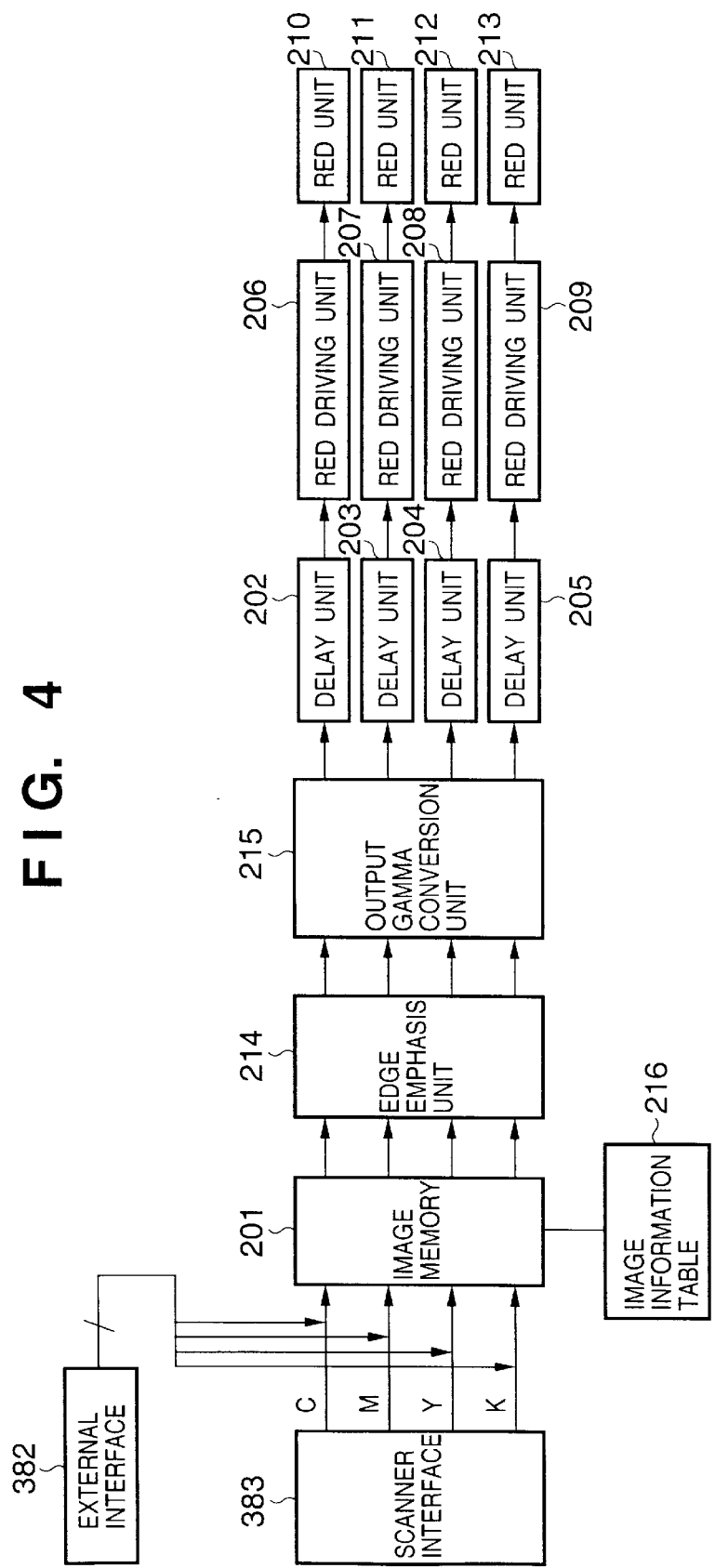
FIG. 4 is a block diagram showing the arrangement of an image processing unit in a printer module.

The image process in the image processing unit 384 will be described in detail below. FIG. 4 is a block diagram showing details of the arrangement of the image processing unit 384, and the building components shown in FIG. 4 are controlled by the printer CPU 385.

C, M, Y, and K image data output from the printer interface 353 of the scanner module 380 shown in FIG. 1 are input to the scanner interface 383 of the printer module 381. This means that a scanner image is input from the scanner interface 383 shown in FIG. 4. The C, M, Y, and K image data input from the scanner interface 383 are temporarily stored in a large-capacity image memory 201. Note that the image memory 201 can basically be either a semiconductor memory or a fixed storage device, or may be a combination thereof. That is, the arrangement of the image memory is not particularly limited as long as it can store an image. However, in this embodiment, the image memory is characterized by comprising the arrangement shown in FIG. 8 (to be described later).

Reference numeral 216 denotes an image information table which holds information such as a color mode or the like, which pertains to image data stored in the image memory 201. The image information table 216 will be described in detail later.

Simultaneously with or after storage of the image data in the image memory 201, the image data are read out from the image memory 201 in response to an image output request such as a paper leading end signal or the like from the paper leading end sensor 347, and undergo edge emphasis in an edge emphasis unit 214. The image data then undergo table conversion in an output gamma conversion unit 215 in correspondence with the characteristics of the printer. The C, M, Y, and K image data are respectively sent to delay units 202 to 205, and their timings are shifted by predetermined delays in units of colors, thereby adjusting the distance differences between the paper leading end sensor and the respective image forming units. In this manner, four color images can be printed at predetermined positions. LED driving units 206 to 209 generate drive signals of LEDs 210 to 213 of the corresponding colors.

<Image Copying Function>

The operation when the image forming apparatus of this embodiment implements an image copying function will be explained below. When a copy button on the console 355 is pressed, the scanner module 380 outputs an image output request to the printer module 381. In response to this request, the printer module 381 supplies an image scan request to the scanner module 380, which starts a scan of an original image, as described above. Simultaneously with this scan or after completion of the image scan, the printer module 381 forms an image on a recording sheet on the basis of image data input from the scanner module 380, as described above, and exhausts the recording sheet onto the exhaust tray 335.

In this manner, the image forming apparatus of this embodiment can copy an original image.

<ACS Function>

An auto color select (ACS) function of automatically discriminating if an original image to be scanned is a monochrome or color image will be explained below.

[Outline of ACS]

ACS is a function of discriminating if an original image is a monochrome or color image. Hence, color discrimination can be done by obtaining saturation levels in units of pixels, and checking the number of pixels, the saturation levels of which are equal to or higher than a given threshold value. However, even for, e.g., a monochrome image, since its scan image has a large number of color pixels around an edge due to the influences of various processes such as MTF, and the like from the microscopic view, it is generally difficult to simply make ACS discrimination in units of pixels. For this reason, various ACS schemes have been proposed. However, since a characteristic feature of this embodiment does not lie in the ACS method itself, ACS is done by a general scheme, and the following explanation will be given.

Figure 5:
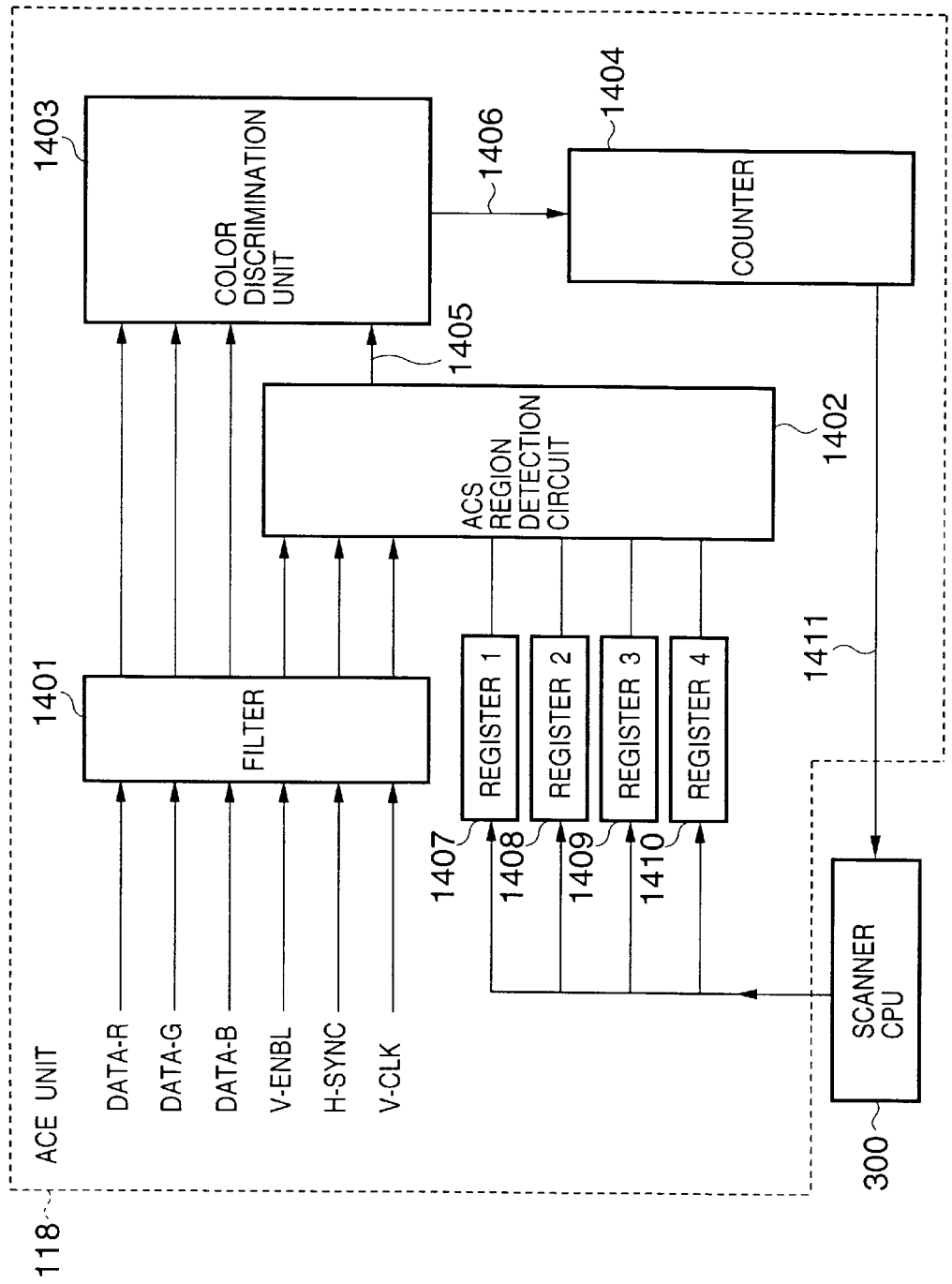
FIG. 5 is a block diagram showing the arrangement of an ACS unit.

FIG. 5 is a block diagram showing details of the arrangement of the ACS unit 118 shown in FIG. 2. As can be seen from FIG. 5, the ACS unit is controlled by the scanner CPU 300.

As described above, even when a monochrome image is scanned, the scan image has a large number of color pixels from the microscopic view. Hence, it must be checked based on information of color pixels around the pixel of interest if that pixel is truly a color pixel. For this purpose, the ACS unit comprises a filter 1401 having a FIFO structure, so that pixels around the pixel of interest can be referred to. Reference numeral 1402 denotes an ACS region detection circuit for generating an ACS region signal 1405 indicating a region which is to undergo ACS (ACS region) on the basis of values set in registers 1407 to 1410 by the scanner CPU 300. Note that the generation process of the ACS region signal 1405 will be explained in detail later.

Reference numeral 1403 denotes a color discrimination unit for discriminating if the pixel of interest is a color or monochrome pixel by looking up surrounding pixels held in the filter 1401 with respect to the pixel of interest, using the input ACS region signal 1405 as an enable signal, and outputting a color discrimination signal 1406. More specifically, for the ACS region indicated by the ACS region signal 1405, the minimum value of DATA-R, DATA-G, and DATA-B is subtracted from the values of the remaining two components, and the absolute values of the obtained two differences are obtained as saturation levels. Only when specific continuity of pixels having saturation levels larger than a given threshold value is confirmed with respect to the pixel of interest, the color discrimination signal 1406 is output to indicate that the pixel of interest is a color pixel.

Reference numeral 1404 denotes a counter for counting color discrimination signals 1406 output from the color discrimination unit 1403. The count result is supplied to the scanner CPU 300 as an ACS discrimination signal 1411. Upon completion of the scan of the entire original, the scanner CPU 300 can determine based on the ACS discrimination signal 1411 output from the counter 1406 if the original has a color or monochrome image.

As described above, the scanner CPU 300 determines a region which is to undergo ACS for the scan range, and sets values indicating that region in the registers 1407 to 1410. In this embodiment, an ACS region can be independently set irrespective of the size, position, and the like of an original placed on the platen glass 301.

[ACS Region Setup]

The generation process of the ACS region signal 1405 based on the setup values of the registers 1407 to 1410 in the ACS region detection circuit 1402 will be described in detail below with reference to FIGS. 6A and 6B.

FIG. 6A is a timing chart showing the generation process of the ACS region signal on the basis of the signals shown in FIG. 3A and the values set in the registers 1407 to 1410.

In FIG. 6A, reference numeral 1501 denotes a sub-scan ACS region signal indicating the ACS region in the sub-scan direction. Counting of H-SYNC is started at the effective edge timing of V-ENBL, and when a compare match between the count value and the value set in the register 1407 is generated, the signal 1501 outputs effective level H. When a compare match between the count value and the value set in the register 1408 is generated in turn, the signal 1501 returns to ineffective level L. In the example shown in FIG. 6A, as can be seen from the above description, since the sub-scan ACS region signal 1501 changes to H level in response to the second H-SYNC from the effective edge of V-ENBL, and returns to L level in response to the sixth H-SYNC, values "2" and "6" are set in the registers 1407 and 1408.

Reference numeral 1502 denotes a main scan ACS region signal indicating an ACS region in the main scan direction. Counting of V-CLK starts at the effective edge timing of H-SYNC, and when a compare match between the count value and the value set in the register 1409 is generated, the signal 1502 generates effective level H. At the generation timing of a compare match with the value set in the register 1410 in turn, the signal 1502 returns to ineffective level L. In the example shown in FIG. 6A, as can be seen from the above description, since the main scan ACS region signal 1502 changes to H level in response to the fourth V-CLK from the effective edge of H-SYNC and returns to L level in response to the 13th V-CLK, values "4" and "13" are respectively set in the registers 1409 and 1410.

The ACS region detection circuit 1402 generates the ACS region signal 1405 by ANDing the sub-scan ACS region signal 1501 and main scan ACS region signal 1502.

FIG. 6B shows the relationship between the timing chart in FIG. 6A and the scan position of the original image. The main scan direction agrees with the X-direction, and the sub-scan direction agrees with the Y-direction. In FIG. 6B, the outer rectangle indicates a normal image scan region, and the inner rectangle indicates an ACS region. Also, sizes 1504 to 1509 in FIG. 6B change depending on the contents of the registers 1407 to 1410. That is, the sizes 1504 to 1509 correspond to the ranges denoted by the same reference numerals in FIG. 6A.

[General ACS Sequence]

Upon executing ACS, it is a common practice to independently control a main scan for actually capturing an image signal and a prescan for executing ACS.

Figure 7:
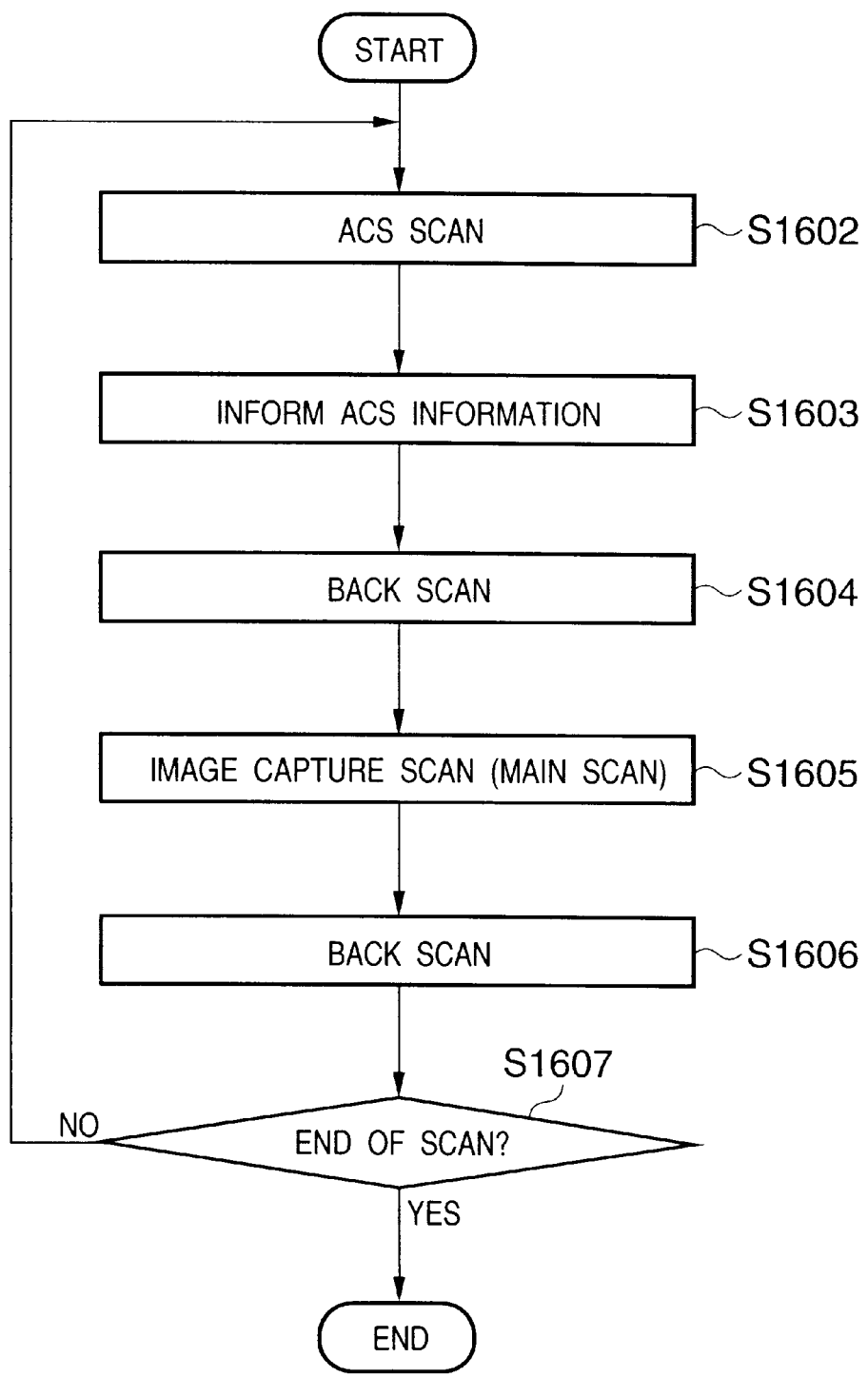
FIG. 7 is a flow chart showing a general ACS process.

FIG. 7 is a flow chart showing a general ACS process, and this process will be explained below. As described above, this ACS process is controlled by the scanner CPU 300.

Referring to FIG. 7, when a job is launched upon depression of the copy button on the console 355 to start an ACS sequence, a prescan for ACS (ACS scan) is done in step S1602. When the color mode of an original is determined by executing ACS, information for switching an image forming process is sent to the printer module 381, and image processing parameters in the scanner module 380 are set under the control of the scanner CPU 300 in step S1603.

In step S1604, the first carriage 314 is moved to return from the ACS end point to the original scan start position (back scan) to prepare for a main scan for the original.

In step S1605, the main scan is done to capture an image signal. In step S1606, the first carriage 314 is moved to return to the original scan start position to prepare for the process of the next original (back scan). If no next original remains and the scan is complete, the job ends; if the next original remains, the flow returns to step S1602 after an original is exchanged (S1607), and the aforementioned process is repeated.

In this way, in the general ACS process, two scans, i.e., the ACS scan and main scan, are made for a single original.

[ACS Sequence of Embodiment]

The general ACS sequence has been explained. An ACS sequence as a characteristic feature of this embodiment will be explained in detail below.

Since the conventional ACS process requires two scans per original, as described above, the productivity impairs in most cases.

In this embodiment, since a memory for storing an image is arranged as follows in consideration of cost reductions of memory elements, storage device, and the like in recent years, the need for synchronizing the scanner and printer upon image formation can be obviated, thus avoiding low productivity in the ACS process.

Figure 8:
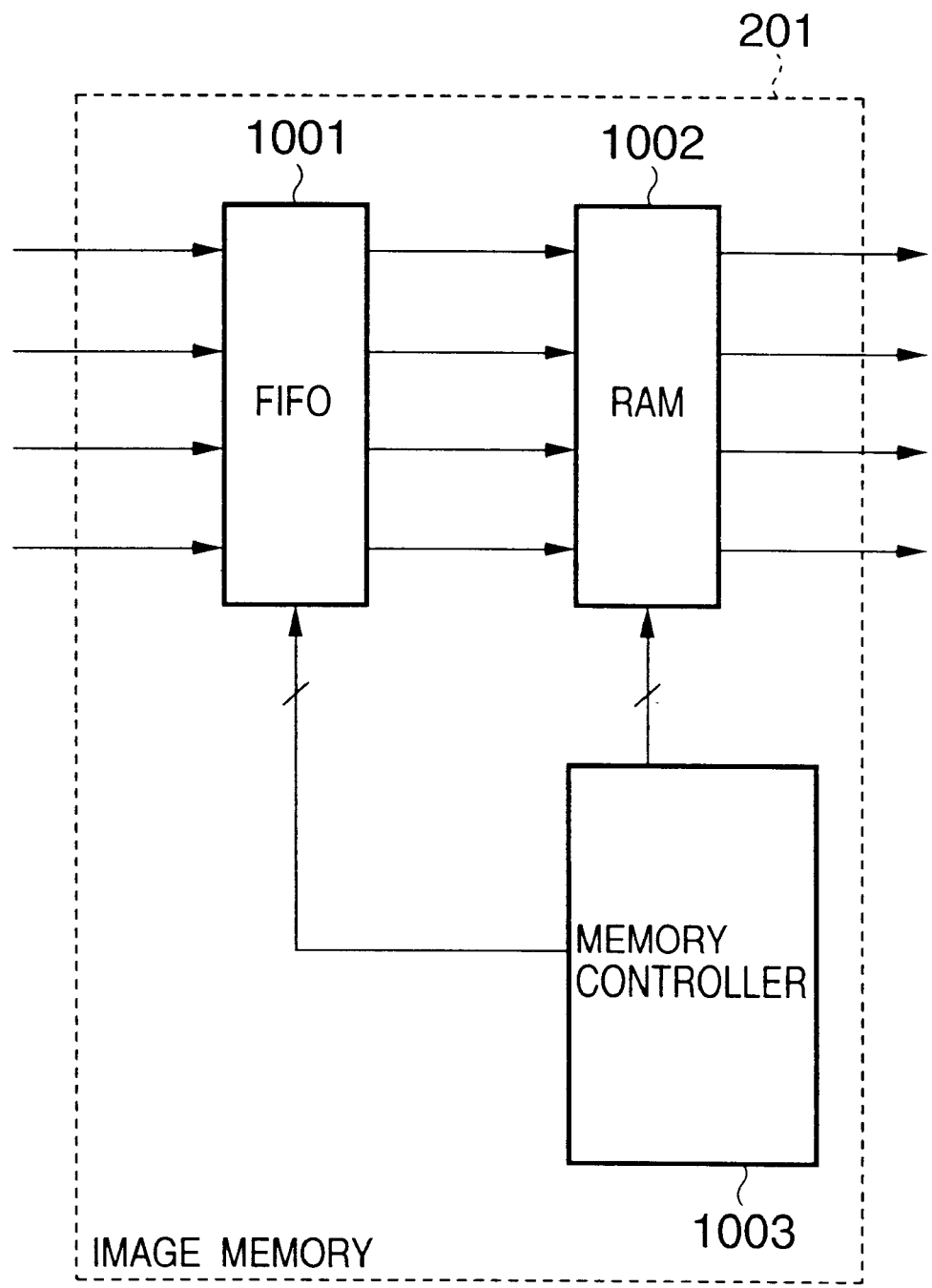
FIG. 8 is a block diagram showing the arrangement of an image memory in the printer module.

FIG. 8 is a block diagram showing details of the arrangement of the image memory 201 shown in FIG. 4.

C, M, Y, and K image data, which are scanned by the scanner module 380 and are sent to the printer module 381 via the scanner interface 383, are written in a FIFO 1001 in the image memory 201. This write is made at a timing based on an image scan sync signal in the scanner module 380.

Figure 9:
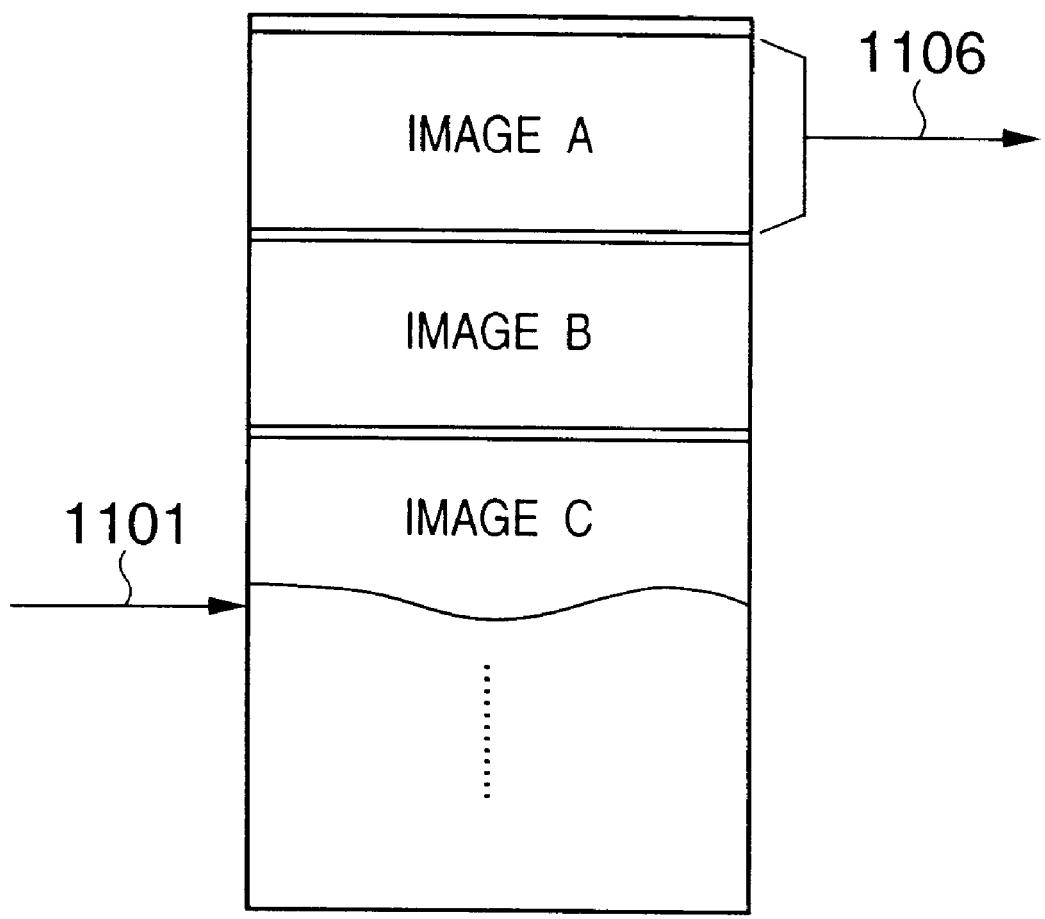
FIG. 9 is a memory map showing the RAM configuration.

A RAM 1002 in the image memory 201 stores and holds image data in units of pages like image A, image B, image C, . . . , as shown in the memory map in FIG. 9. Image data is written in the RAM 1002 in synchronism with the image scan in the scanner module 380 but is read out by the printer CPU 385. A memory controller 1003 adjusts synchronization of read/write processes with respect to the RAM 1002.

Under the control of the memory controller 1003, image A is read out by the printer CPU 385 (1106) simultaneously with write of image data input from the scanner module 380 as image C via the FIFO 1001 (e.g., using an index 1101), as shown in, e.g., FIG. 9. The read/write concurrent process with respect to the RAM 1002 is implemented by time-divisional accesses.

In this embodiment, since the image memory 201 in which data is written at the control timing of the scanner module 380 and from which data is read out at the control timing of the printer module 381 adopts the aforementioned arrangement, synchronization between the scanner and printer is controlled by the memory controller 1003. Hence, the scanner module 380 can read image data without waiting for a busy state or the like of the printer module 381, i.e., irrespective of the operation state of the printer module 381.

In other words, since image formation is not done simultaneously with scan of image data of an original, when, especially, ACS is executed, the color mode of the original need not be determined by ACS prior to scan of the image data of the original. That is, as can be seen from the above description, when ACS is executed in this embodiment, a prescan for ACS need not always be made before the main scan.

Figure 10:
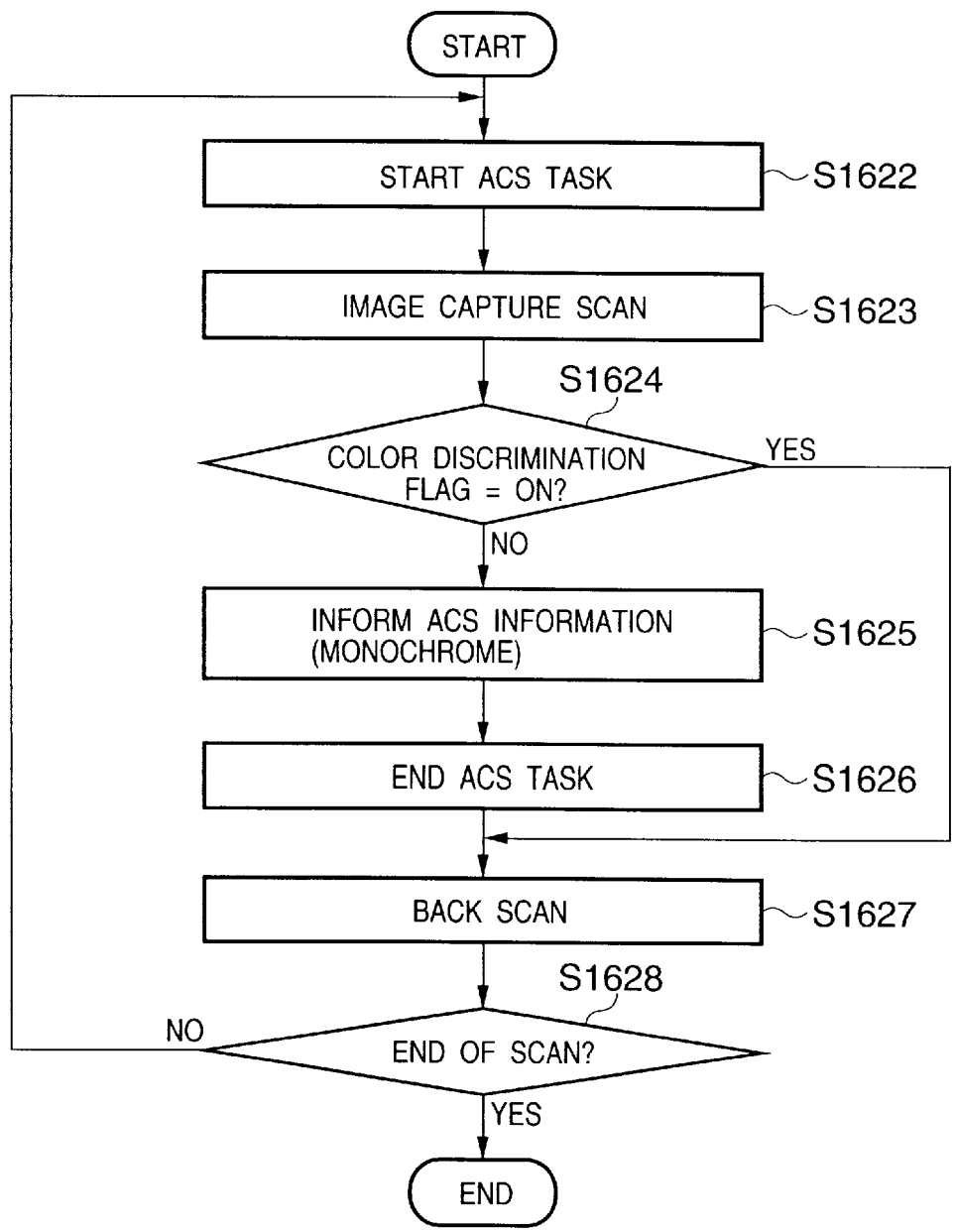
FIG. 10 is a flow chart showing an ACS process in an embodiment of the present invention.

FIG. 10 is a flow chart showing the ACS process in this embodiment, and this process will be explained below. Note that the ACS process of this embodiment is also controlled by the scanner CPU 300.

Referring to FIG. 10, when a job is launched upon depression of the copy button on the console 355 to start an ACS sequence, an ACS task is launched in step S1622. Note that the ACS task in this embodiment executes ACS during the main scan for capturing image data monitors the contents of the registers in the counter 1404 in the ACS unit 118 shown in FIG. 5, i.e., the count value of the color discrimination signals 1406.

In step S1623, a scan, which corresponds to the conventional main scan, is started to capture an image. The captured image data is sent to the printer module 381, and is written, and stored and held in the RAM 1002 in the image memory 201.

Figure 11:
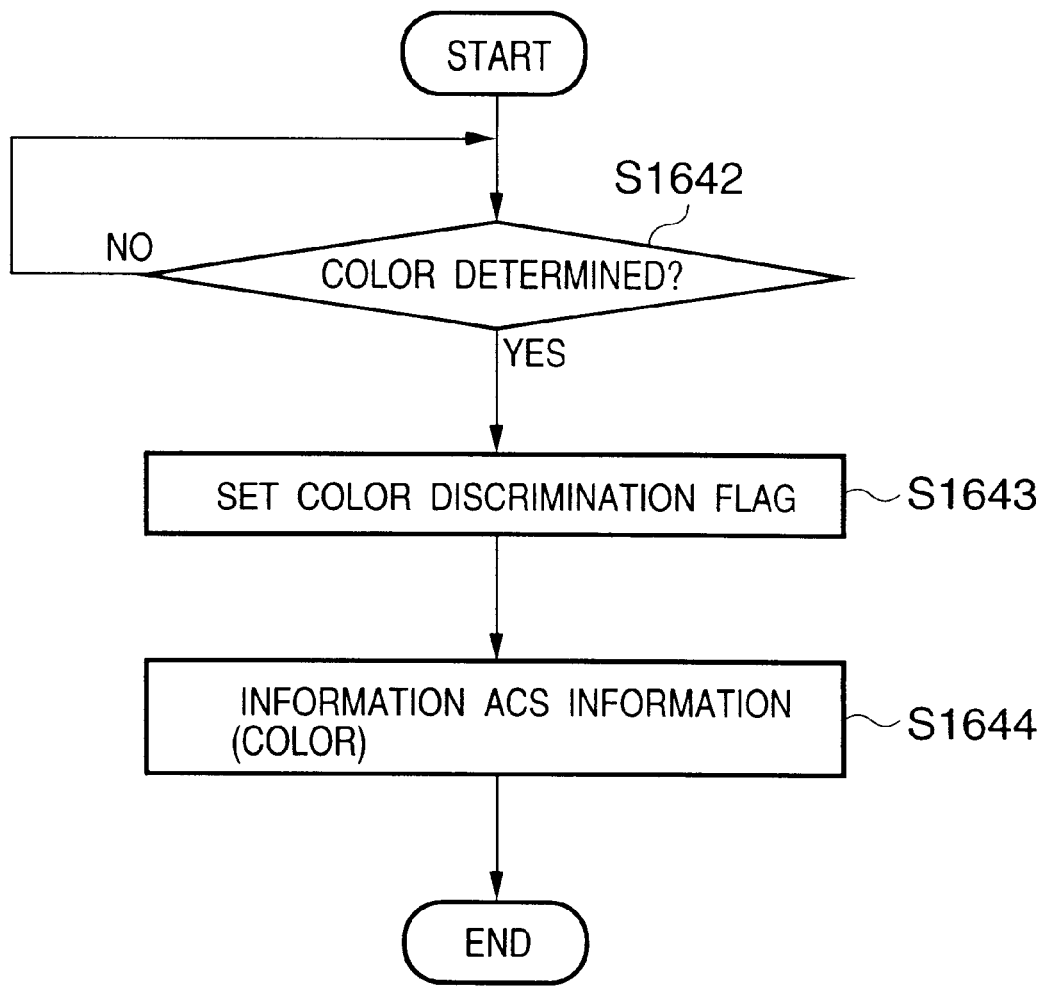
FIG. 11 is a flow chart showing an ACS task in the embodiment of the present invention.

In this embodiment, the ACS task operates during the scan in step S1623. FIG. 11 is a flow chart of the ACS task. In this task, it is monitored in step S1642 if the count value of the counter 1404 has become equal to or larger than a predetermined threshold value. If the count value has exceeded the threshold value, since it is determined that the original is a color original, the flow advances to step S1643 to set a color discrimination flag. In step S1644, the task informs the printer module 381 of the ACS discrimination result="color" under the control of the scanner CPU 300, thus normally ending the task.

Referring back to FIG. 10, upon completion of the scan in step S1623, the color discrimination flag set by the ACS task is evaluated in step S1624. If the color discrimination flag is ON, since the ACS task has already determined that the original is a color original and has always informed the printer module 381 of that result, the flow advances to step S1627.

On the other hand, if it is determined in step S1624 that the color discrimination flag is OFF, since it is determined that the original is a monochrome original, the flow advances to step S1625 to inform the printer module 381 of the ACS discrimination result ="monochrome" under the control of the scanner CPU 300. The ACS task ends in step S1626.

In this embodiment, if the color discrimination flag is OFF, it is unconditionally determined that the original is a monochrome original. Alternatively, the color mode may be determined after the count value of the counter 1404 is referred to again in step S1625.

In step S1627, a back scan is made to prepare for scanning the next original, and the first carriage 314 is moved to the scan position of the next original. It is checked in step S1628 if the next original to be scanned remains. If YES in step S1628, the flow returns to step S1622 to repeat the above process; otherwise, the job ends.

<Image Information Table>

As described above, the color mode information sent to the printer module 381 under the control of the scanner CPU 300 is stored in the image information table 216 shown in FIG. 4 by the printer CPU 385. The image information table 216 holds various kinds of information that pertain to images so as to manage the images held in the image memory 201 (RAM 1002). FIG. 12 shows an example of this image information table.

As can be seen from FIG. 12, since an image with image number "1" has "color information"="color" and "image size"="standard A4", that image is an image of the A4-size color original. Likewise, an image with image number "2" is a monochrome original, and has the standard A4 size.

The storage area of the column "color information" in the image information table 216 stores color information of an image stored in the RAM 1002. Hence, ACS information for a given image, which is sent in step S1625 in FIG. 10 or step S1644 in FIG. 11, is stored as a color mode at a predetermined location in the image information table 216.

Since the printer CPU 385 controls the edge emphasis level in the edge emphasis unit 214 and switching of a table value in the output gamma conversion unit 215, and the like shown in FIG. 4 on the basis of the color mode stored in the image information table 216, an appropriate image process corresponding to the color mode can be done, and a high-quality image can be formed.

Also, since the printer CPU 385 controls based on the color mode to select whether all the M, C, Y, and K image forming units 317 to 320 are used or the K image forming unit 320 alone is used, an image forming process optimal to the color mode of the original can be selected.

Note that the image information table 216 may be held in a RAM or the like (not shown) in the printer module 381. Also, the contents of the table are not limited to the example shown in FIG. 12, and other kinds of information pertaining to image data can also be held.

In this embodiment, after the ACS performed on the image data by using the image memory 201 and the image information table 216, the image data is outputted for image forming at once. However, the present invention is not limited to this specific embodiment. It is possible to store plural ACS results in the image information table 216 in link with the corresponding image data stored in the image memory 201. Therefore, it is possible to obtain an image formed with plural reduced images by, e.g., the "4 in 1" process for forming an image by arranging four reduced images wherein each of the reduced images is applied with appropriate image process that reflects the color/monochrome attributes based on the corresponding ACS result.

As described above, according to this embodiment, ACS discrimination is made simultaneously with an image scan without any prescan, and when the color mode is determined while transferring image data to the image memory or after image transfer is complete, color information of the original is sent to the printer side. Also, the color mode is stored in a management area corresponding to the original, and appropriate image formation is done based on the color mode.

That is, since ACS for an original image can be executed at high speed by a single image scan, an appropriate image forming process that reflects the color mode can be executed.

When this embodiment is applied to a one-pass input image scan device (that scans an image by a one-way scan), since the need for a prescan is omitted, an appropriate ACS function can be provided without impairing productivity.

Also, in the image forming apparatus of this embodiment, since read/write of image data need not be synchronized between the scanner and printer upon ACS, a continuous scan of original images using an automatic document feeder (ADF) can be done at high speed, thus improving productivity upon ACS.

In this embodiment, image formation is done based on the color mode obtained as the ACS result. However, the present invention is not limited to such specific embodiment. For example, image data captured by the scanner module 380 and color mode information can be output together to another apparatus via the external interface 313.

[Another Embodiment]

Note that the above embodiment uses the arrangement shown in FIG. 1. Alternatively, the process of FIG. 1 can be implemented by a program.

Since an image input device can be a network, video camera, image scanner, or storage device (floppy or the like), the present invention can be applied to a system or versatile information processing apparatus (personal computer or the like) having one of these devices.

Hence, the objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting image data of an original by a single optical scan;
   discrimination means for discriminating based on the image data if the original is a color original;
   holding means for holding image data of a plurality of originals input by said input means and a plurality of discrimination results for the image data of the plurality of originals from said discrimination means;
   output means for outputting the image data held in said holding means on the basis of the discrimination result; and
   control means for asynchronously controlling a writing operation of the image data input into said holding means by said input means and a reading operation of the image data from said holding means to said output means, wherein said discrimination means performs the discrimination in parallel with the input of the image data by said input means.

2. The apparatus according to claim 1, wherein the plurality of image data are a plurality of pages of image data.

3. The apparatus according to claim 1, wherein when said discrimination means discriminates during input of image data by said input means that the original is a color original, said holding means holds the discrimination result before the end of input of the image data.

4. The apparatus according to claim 1, wherein said output means forms an image based on the image data held in said holding means on a recording medium.

5. The apparatus according to claim 4, wherein said output means sets image processing contents required upon image formation on the basis of the discrimination result held in said holding means.

6. The apparatus according to claim 4, wherein said output means sets a process of image formation on the basis of the discrimination result held in said holding means.

7. An image processing system that connects an image input device and image output device,
   said image input device comprising:
      input means for inputting image data of an original by a single optical scan;
      discrimination means for discriminating based on the image data if the original is a color original; and
      sending means for sending the image data and the discrimination result to said image output device, and
   said image output device comprising:
      reception means for receiving the image data and the discrimination result sent from said image input device;
      holding means for holding image data of a plurality of originals sent by said image input device and a plurality of discrimination results for the image data of the plurality of originals from said discrimination means;
      output means for outputting the image data held in said holding means on the basis of the discrimination result; and
      control means for asynchronously controlling a writing operation of the image data input by said input means into said holding means and a reading operation of the image data from said holding means to said output means, wherein said discrimination means performs the discrimination in parallel with the input of the image data by said input means.

8. An image processing method comprising:
   the input step of inputting image data of an original by a single optical scan;
   the discrimination step of discriminating parallel to input of the image data and based on the image data if the original is a color original;
   the holding step of holding in a memory image data of a plurality of originals input in the input step and a plurality of discrimination results for the image data of the plurality of originals from the discrimination step;
   the output step of outputting the image data stored in the memory on the basis of the discrimination result; and
   the control step of asynchronously controlling a writing operation of the image data input into the memory in the input step and a reading operation of the image data from the memory in the output step,
   wherein in the discrimination step the discrimination is performed in parallel with the input of the image data in the input step.

9. A recording medium that records a program code of an image process, said program code having at least:
   a code of the input step of inputting image data of an original by a single optical scan;
   a code of the discrimination step of discriminating parallel to input of the image data and based on the image data if the original is a color original;
   a code of the holding step of holding in a memory image data of a plurality of originals input in the input step and a plurality of discrimination results for the image data of the plurality of originals in the discrimination step;
   a code of the output step of outputting the image data stored in the memory on the basis of the discrimination result; and
   a code of the control step of asynchronously controlling a writing operation of the image data input into the memory in the input step and a reading operation of the image data from the memory in the output step,
   wherein in the discrimination step the discrimination is performed in parallel with the input of the image data in the input step.

10. An image processing apparatus connected to an image output device, comprising:
   input means for inputting image data of an original by a single optical scan;
   discrimination means for discriminating based on the image data if the original is a color original;

holding means for holding image data of a plurality of originals input by said input means and a plurality of discrimination results for the image data of the plurality of originals from said discrimination means;

output means for outputting the image data and discrimination result to said image output device; and control means for asynchronously controlling a writing operation of the image data input into said holding means by said input means and a reading operation of the image data from said holding means to said output means, wherein said discrimination means performs the discrimination in parallel with the input of the image data by said input means.

11. An image processing apparatus connected to an image input device, comprising:

input means for receiving, from said image input device, image data, and color information indicating if the image data is color data;

holding means for holding the received image data and color information; and output means for outputting the held image data on the basis of the color information, said image input device comprising input means for inputting image data of an original by a single optical scan;

discrimination means for discriminating based on the image data if the original is a color original;

holding means for holding image data of a plurality of originals input by said input means and a plurality of discrimination results for the image data of the plurality of originals from said discrimination means;

output means for outputting a discrimination result as the color information together with the image data; and control means for asynchronously controlling a writing operation of the image data input into said holding means by said input means and a reading operation of the image data from said holding means to said output means, wherein said discrimination means performs the discrimination in parallel with the input of the image data by said input means.

12. An image processing method for an image processing apparatus connected to an image output device, comprising:

the input step of inputting image data of an original by a single optical scan;

the discrimination step of discriminating based on the image data if the original is a color original;

the holding step of holding in a memory image data of a plurality of originals input in the input step and a plurality of discrimination results for the image data of the plurality of originals from the discrimination step;

the output step of outputting the image data and discrimination result to said image output device; and the control step of asynchronously controlling a writing operation of the image data input into the memory in the input step and a reading operation of the image data from the memory in the output step, wherein in the discrimination step the discrimination is performed in parallel with the input of the image data in the input step.

13. An image processing method for an image processing apparatus connected to an image input device, comprising:

the input step of receiving, from said image input device, image data, and color information indicating if the image data is color data;

the holding step of holding the received image data and color information; and the output step of outputting the held image data on the basis of the color information, wherein said image input device inputs image data of an original by a single optical scan, discriminates based on the image data if the original is a color original, in parallel with the input of the image data, holds image data of a plurality of originals input by said input means and a plurality of discrimination results for the image data of the plurality of originals from said discrimination means, outputs a discrimination result as the color information together with the image data, and asynchronously controls a writing operation of the image data input into said holding means by said input means and a reading operation of the image data from said holding means to said output means.

14. A recording medium that records a program of an image process in an image processing apparatus connected to an image output device, said program having at least:

a code of the input step of inputting image data of an original by a single optical scan;

a code of the discrimination step of discriminating based on the image data if the original is a color original;

a code of the holding step of holding in a memory image data of a plurality of originals input in the input step and a plurality of discrimination results for the image data of the plurality of originals in the discrimination step;

a code of the output step of outputting the image data and discrimination result to said image output device; and a code of the control step of asynchronously controlling a writing operation of the image data input into the memory in the input step and a reading operation of the image data from the memory in the output step, wherein in the discrimination step the discrimination is performed in parallel with the input of the image data in the input step.

15. A recording medium that records a program of an image process in an image processing apparatus connected to an image input device, said program having at least:

a code of the input step of receiving, from said image input device, image data, and color information indicating if the image data is color data;

a code of the holding step of holding the received image data and color information; and a code of the output step of outputting the held image data on the basis of the color information, wherein said image input device inputs image data of an original by a single optical scan, discriminates based on the image data if the original is a color original, in parallel with the input of the image data, holds image data of a plurality of originals input by said input means and a plurality of discrimination results for the image data of the plurality of originals of said discrimination means, outputs a discrimination result as the color information together with the image data, and asynchronously controls a writing operation of the image data input into said holding means by said input means and a reading operation of the image data from said holding means to said output means.

* * * * *

UNITED STATES PATENT AND TRADEMARK OFFICE
CERTIFICATE OF CORRECTION

PATENT NO. : 6,804,033 B1
DATED : October 12, 2004
INVENTOR(S) : Kenji Hara

It is certified that error appears in the above-identified patent and that said Letters Patent is hereby corrected as shown below:

<u>Column 6,</u>
Line 42, "along" should read -- along with --.

<u>Column 15,</u>
Line 23, "information," should read -- information, and --.
Line 25, "comprising" should read -- comprising: --.

Signed and Sealed this

Twenty-fifth Day of January, 2005

JON W. DUDAS
*Director of the United States Patent and Trademark Office*